US008615663B2

(12) United States Patent
Buer

(10) Patent No.: US 8,615,663 B2
(45) Date of Patent: Dec. 24, 2013

(54) SYSTEM AND METHOD FOR SECURE REMOTE BIOMETRIC AUTHENTICATION

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1217 days.

(21) Appl. No.: 11/785,389

(22) Filed: Apr. 17, 2007

(65) Prior Publication Data

US 2008/0215890 A1    Sep. 4, 2008

Related U.S. Application Data

(60) Provisional application No. 60/792,338, filed on Apr. 17, 2006.

(51) Int. Cl.
  *H04L 9/00*    (2006.01)
(52) U.S. Cl.
  USPC ............................ 713/186; 713/157; 713/168
(58) Field of Classification Search
  USPC .................. 713/156–158, 168, 175, 182, 186; 726/5, 21; 382/115
  See application file for complete search history.

(56) References Cited

U.S. PATENT DOCUMENTS

| | | | |
|---|---|---|---|
| 5,706,512 A * | 1/1998 | Bahls et al. .................... | 711/147 |
| 5,781,723 A | 7/1998 | Yee et al. | |
| 5,970,147 A | 10/1999 | Davis | |
| 6,092,201 A * | 7/2000 | Turnbull et al. .................. | 726/4 |
| 6,189,096 B1 * | 2/2001 | Haverty ........................ | 713/155 |
| 6,233,685 B1 | 5/2001 | Smith et al. | |
| 6,292,892 B1 | 9/2001 | Davis | |
| 7,111,172 B1 * | 9/2006 | Duane et al. ................... | 713/182 |
| 7,366,305 B2 | 4/2008 | Brickell | |
| 2001/0037453 A1 * | 11/2001 | Mitty et al. .................... | 713/168 |
| 2002/0023217 A1 | 2/2002 | Wheeler et al. | |
| 2002/0184217 A1 * | 12/2002 | Bisbee et al. ...................... | 707/9 |
| 2003/0126121 A1 * | 7/2003 | Khan et al. ......................... | 707/3 |
| 2003/0177102 A1 * | 9/2003 | Robinson ......................... | 705/75 |
| 2005/0039016 A1 | 2/2005 | Aissi et al. | |
| 2005/0144440 A1 | 6/2005 | Catherman et al. | |
| 2005/0147250 A1 * | 7/2005 | Tang .............................. | 380/259 |
| 2005/0166051 A1 | 7/2005 | Buer | |
| 2006/0090070 A1 * | 4/2006 | Bade et al. ..................... | 713/164 |
| 2007/0118745 A1 * | 5/2007 | Buer .............................. | 713/168 |
| 2007/0118891 A1 * | 5/2007 | Buer ................................. | 726/8 |
| 2007/0155366 A1 * | 7/2007 | Manohar et al. .............. | 455/411 |
| 2007/0245148 A1 * | 10/2007 | Buer .............................. | 713/182 |

* cited by examiner

*Primary Examiner* — Hadi Armouche
(74) *Attorney, Agent, or Firm* — Sterne, Kessler, Goldstein & Fox PLLC

(57) ABSTRACT

Systems and methods for secure remote biometric authentication are provided. A network-based biometric authentication platform stores biometric templates for individuals which have been securely enrolled with the authentication platform. A plurality of sensor platforms separately establishes secure communications with the biometric authentication platform. The sensor platform can perform a biometric scan of an individual and generate a biometric authentication template. The sensor platform then requests biometric authentication of the individual by the biometric authentication platform via the established secure communications. The biometric authentication platform compares the generated biometric template to one or more of the enrolled biometric templates stored in memory at the biometric authentication platform. The result of the authentication is then communicated to the requesting sensor platform via the established secure communications.

20 Claims, 5 Drawing Sheets

SYSTEM AND METHOD FOR SECURE REMOTE BIOMETRIC AUTHENTICATION

CROSS-REFERENCE TO RELATED APPLICATIONS

This application claims the benefit of U.S. Provisional Application No. 60/792,338, filed Apr. 17, 2006, which is herein incorporated by reference in its entirety.

FIELD OF THE INVENTION

This application relates generally to data communications and more specifically to information security.

BACKGROUND OF THE INVENTION

The use of computer technologies to perform financial and other high value transactions continues to increase. Because of the nature of these transactions, authentication of the parties involved in the transaction is critical. Authentication traditionally takes one of three forms, referred to as factors—something the user is (e.g., fingerprint, retinal scan, etc.), something the user has (e.g., smart card, ID card, computing device, etc), or something the user knows (e.g., PIN, password, etc.). Certain transactions, e.g., financial transactions, require multiple authentication factors (referred to as multi-factor authentication). For example, a user may have to present a smartcard and input a PIN to gain access to a system or specific service.

Biometric authentication is considered a particularly strong form of authentication due to the complexities of spoofing a valid biometric signature for a user. Biometric authentication uses physical or behavioral characteristics of a user for authentication purposes. Examples of biometrics include fingerprints, eye retinas and irises, and voice patterns.

A typical biometric authentication device includes a sensor for generating the biometric print and a processor for analyzing and matching the biometric print against a database including biometric templates of authorized individuals. Because of the risks of eavesdropping, certain man-in-the-middle attacks, and other more sophisticated attacks, the biometric analysis processor and sensor are co-located in the same device or closed system. This increases the cost of an enterprise-wide deployment of biometric authentication. Furthermore, the current implementations bind a user to a specific biometric sensor and processor.

What is therefore needed is a secure distributed biometric authentication system in which biometric templates for users are stored in a centralized authentication processor.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
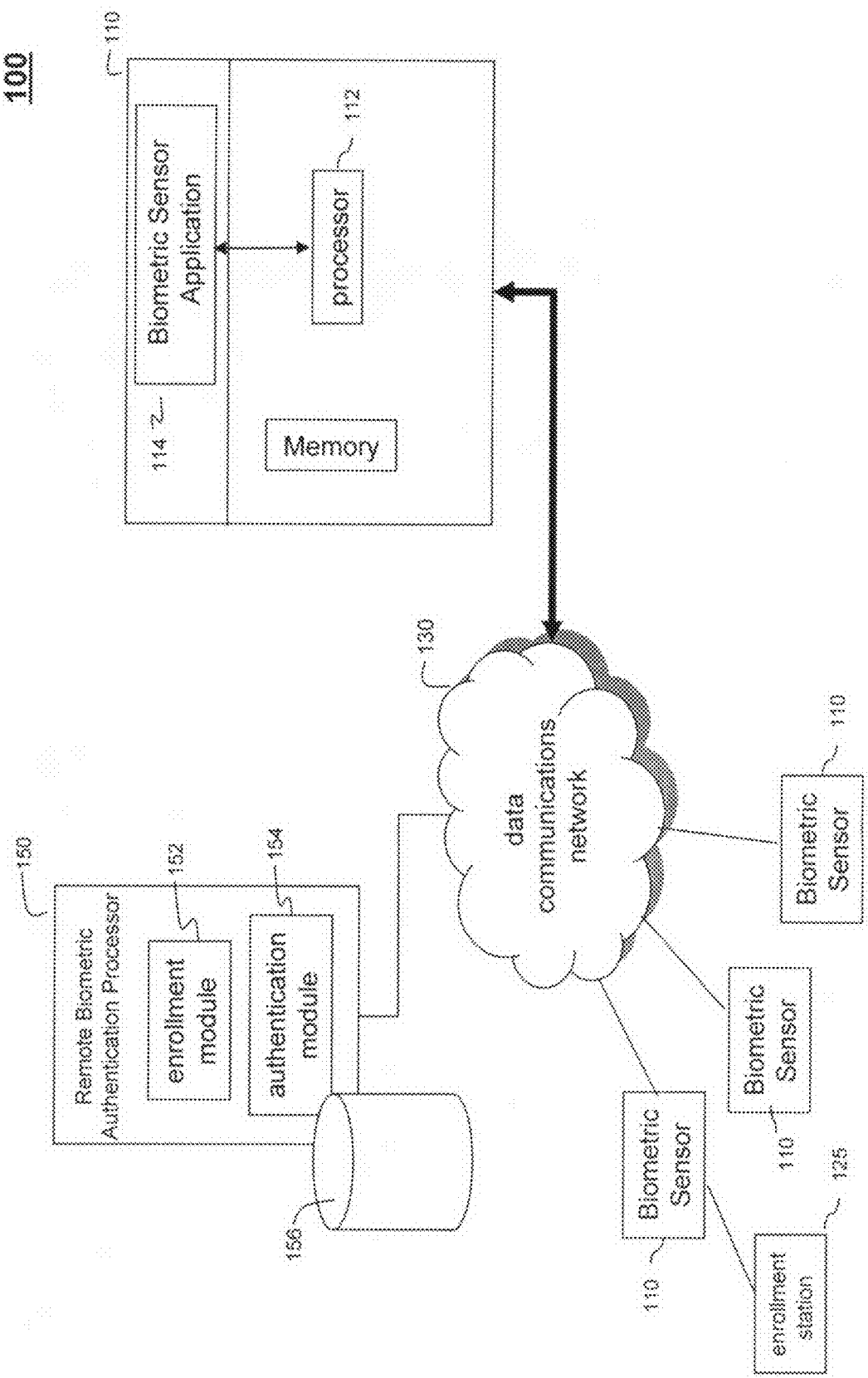
FIG. 1 is a block diagram of an exemplary operating environment for the system for secure distributed biometric authentication, according to an embodiment of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 is a block diagram of an exemplary operating environment 100 for the system for secure distributed biometric authentication, according to an embodiment of the invention. Exemplary operating environment 100 includes a plurality of sensor platforms 110, a data communications network 130, and a remote biometric authentication processor 150.

Sensor platform 110 includes a processor 112 and a biometric sensor application 114. In an embodiment, processor 112 is a secure processor. Biometric sensor application 114 provides logic to control the biometric sensor and direct authentication processing. The computer may also include additional applications which access biometric sensor application 114 when authentication processing is required. For example, sensor platform 110 may include a financial application which requires strong authentication of a user for access to certain transactions.

Processor 112 provides the required cryptographic operations to encrypt, decrypt, and/or authenticate data that is sent to/received from the communication network or sent to/received from a data memory. Processor 112 further includes capabilities to generate an asymmetric key pair (public/private key pair). In an alternate embodiment, the private key is "securely injected" into processor 112. In the secure injection embodiment, the entity which injects the private key must "forget" the private key to ensure the integrity and privacy of the asymmetric key pair. In either embodiment, the private key does not leave the hardware security boundary of processor 112 unless encrypted. An exemplary system and process for securely generating an asymmetric key pair or securely injecting a private key into a processor is described in detail in U.S. Patent Publication No. 2005/0166051, entitled "System and Method for Certification of a Secure Platform," which is incorporated herein by reference in its entirety.

In an embodiment, sensor platform 110 also includes enrollment logic to control enrollment of biometric templates in remote biometric authentication processor 150. In addition or alternatively, one or more sensor platforms 110 may be coupled to a standalone enrollment station 125.

In an embodiment, multiple sensor platforms 110 access remote biometric authentication processor 150 via a communications network 130. Communications network 130 may be a public data communications network such as the Internet, a private data communications network, the Public Switched Telephone Network (PSTN), a wireless communications network, or any combination thereof. The interface between multiple sensor platforms 110 and communications network 130 can be a wireless interface or a wired interface.

Remote biometric authentication processor 150 includes functionality to perform remote biometric authentication for multiple biometric sensor platforms. In an embodiment, remote biometric authentication processor 150 includes a secure processor. In addition, or alternatively, remote biometric authentication processor 150 is located in a facility having a high degree of physical security. In this embodiment, remote biometric authentication processor 150 may have less logical security. Thus, in the biometric authentication system of FIG. 1, enrollment and template comparison during authentication processing is centralized in a secure remote processor rather than being distributed in the individual sensor platforms.

Remote biometric authentication processor 150 includes an enrollment module 152, an authentication module 154, and a memory 156. Remote biometric authentication processor 150 further includes cryptographic capabilities to encrypt, decrypt, and/or authenticate data that is sent to/received from the communication network.

Authentication module 154 includes functionality to compare one or more templates received during an authentication process with enrolled templates stored in memory 156. Authentication processing is described in further detail in FIG. 5 below.

Enrollment module 152 includes functionality to enroll a biometric template for a user in memory 156. Enrollment processing is described in further detail in FIG. 4 below.

Memory 156 stores the biometric templates for users of the biometric authentication system. The templates are stored in memory 156 as part of the enrollment process and used by the authentication module during authentication processing. In addition, memory 156 may store the symmetric key generated for communication with each sensor platform 110, the public key for each sensor platform, and/or the public keys for one or more certificate authorities. Although FIG. 1 illustrates memory 156 as a separate databases, as would be appreciated by persons of skill in the art, memory 156 can be any type of storage and may be included in remote biometric authentication processor 150 or external to remote biometric authentication processor 150.

Figure 2:
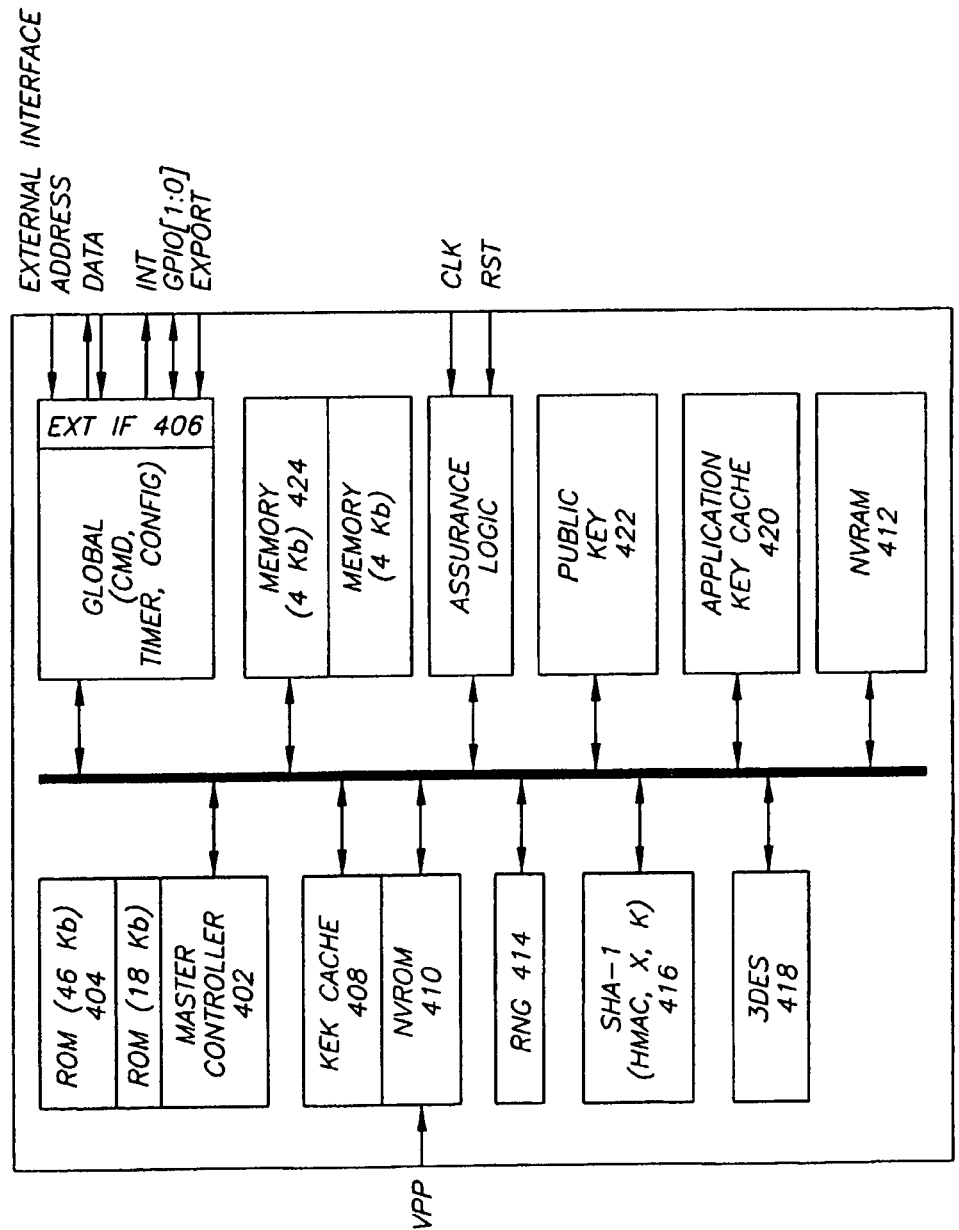
FIG. 2 depicts one embodiment of a sensor platform processor.

FIG. 2 depicts one embodiment of a sensor platform processor 112. The structure and operation of this embodiment is described in further detail in U.S. Patent Publication No. 2005/0166051, entitled "System and Method for Certification of a Secure Platform," which is herein incorporated by reference in its entirety.

Figure 3:
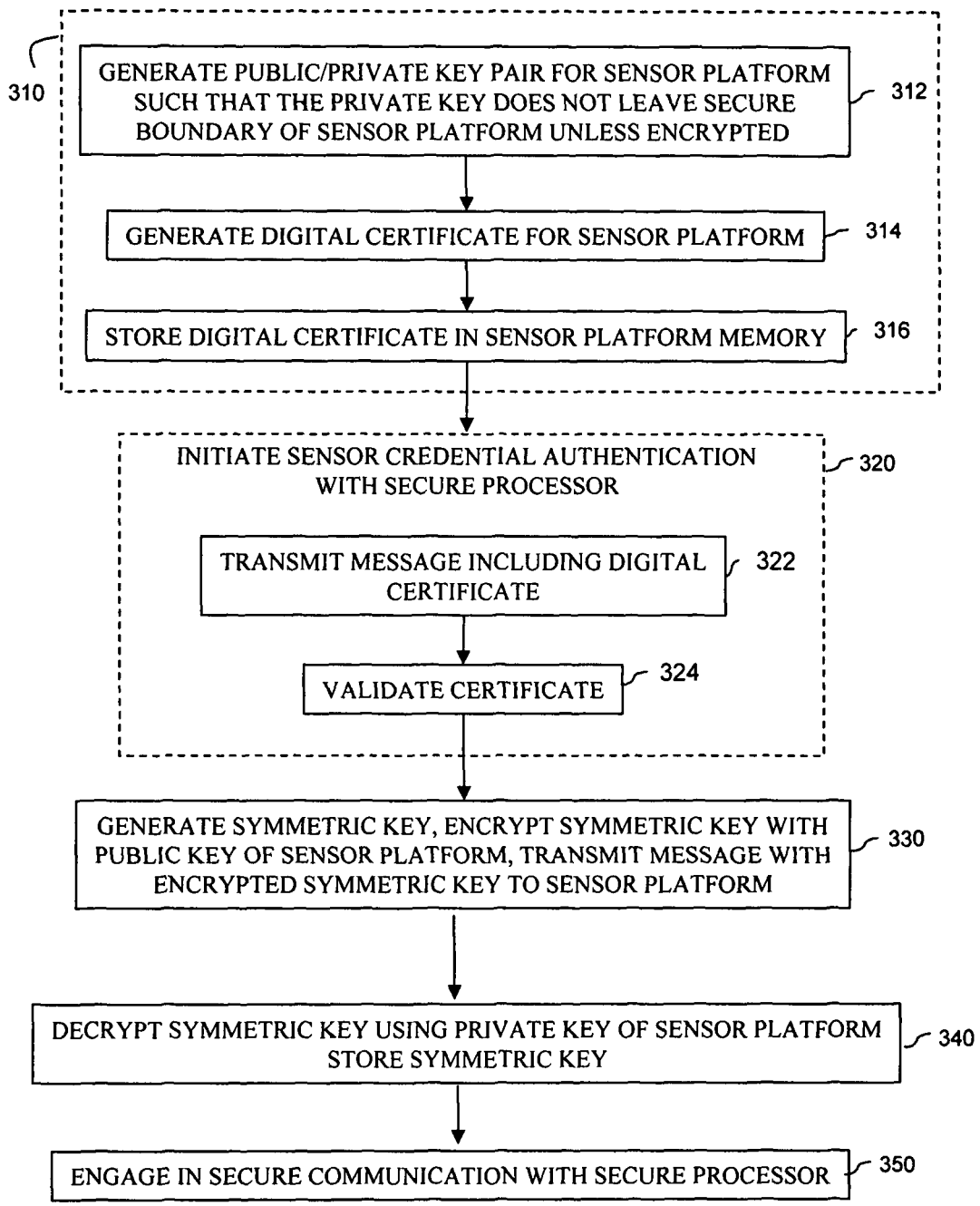
FIG. 3 depicts a flowchart of an illustrative method for secure distributed biometric authentication, according to embodiments of the present invention.

FIG. 3 depicts a flowchart 300 of an illustrative method for secure distributed biometric authentication, according to embodiments of the present invention. Flowchart 300 is described with continued reference to the illustrative system of FIG. 1. However, flowchart 300 is not limited to that embodiment. Note that some steps in flowchart 300 do not have to occur in the order shown.

In step 310, security information for the biometric sensor platform 110 is generated. Step 310 includes steps 312-316. Step 310 generally occurs once per sensor platform 110 prior to initial use of the platform for biometric authentication.

In step 312, an asymmetric key pair (e.g., public/private key pair) is generated by processor 112 of sensor platform 110 such that the private key does not leave the hardware security boundary of the processor unless encrypted. In an alternate embodiment, the private key is "securely injected" into the processor. In the secure injection embodiment, the entity which injects the private key must "forget" the private key to ensure the integrity and privacy of the asymmetric key pair.

In step 314, a digital certificate is generated for the sensor platform. Step 314 may occur at the time of manufacture of the device. Alternatively, step 314 may occur when the sensor platform is configured for use. As would be appreciated by a person of skill in the art, any procedure for generating a digital certificate can be used with the current invention. In an illustrative example, the sensor platform 110 initiates a key enrollment process with a certification authority. During the enrollment process, the sensor platform 110 communicates its public key and optionally identifying information. The certification authority then authenticates the identity of the sensor platform. The verification process can be performed in a variety of ways. For example, when the public/private key pair was generated by the processor, the processor may share the public key, via a secure communication link, with a warranty server. The warranty server stores a listing of valid public keys for sensor platform processors. In this example, the certification authority may query the warranty server to validate that the received public key is a valid public key for a sensor platform processor. In addition or alternatively, the certification authority may validate the identification information provided by the sensor platform.

After the certification authority has authenticated the identity of the sensor platform, the certification authority issues a digital certificate for the sensor platform. The digital certificate binds the identity of the certificate owner (i.e., sensor platform) to a public/private key pair. The digital certificate includes the public key of the sensor platform, a name or other identifier for the sensor platform, an expiration date, serial number, and identification of organization that issued the certificate. The certification authority signs the digital certificate using its private key. As would be recognized by persons of skill in the art, any technique for generating a signed certificate can be used with the present invention. Note that the public key of the certification authority must be publicly available to enable validation of the sensor platform certificate.

In step 316, the digital certificate is stored in memory at the sensor platform 110.

Although step 310 describes security information as including an asymmetric key pair, as would be appreciated by persons of skill in the art, other forms of security information can be used to securely identify the sensor platform.

In step 320, sensor platform 110 initiates credential authentication with the remote biometric authentication processor 150. Step 320 includes step 322 and step 324.

In step 322, the sensor platform 110 transmits a message including its digital certificate to the remote biometric authentication processor 150. Note that the messages in the exchange of step 322 between remote biometric authentication processor 150 and sensor platform 110 may include additional information to deter man-in-the-middle and replay attacks.

In step 324, remote biometric authentication processor 150 validates the received certificate. In step 324 (or prior to step 324), remote biometric authentication processor 150 obtains the public key of the certification authority which issued the certificate to the sensor platform. Remote biometric authentication processor 150 then uses the public key of the certification authority to verify the signature included with the digital certificate. If the certificate is authentic, operation proceeds to step 330. If the certificate is not authentic, flowchart 300 ends.

In step 330, remote biometric authentication processor 150 generates a symmetric key for use in securing communications with sensor platform 110. As would be appreciated by persons of skill in the art, any technique for generating a symmetric key can be used with the present invention. In addition, in step 330, remote biometric authentication processor 150 encrypts the symmetric key with the public key of the sensor platform which was received in the digital certificate. Remote biometric authentication processor 150 then transmits a message including the encrypted symmetric key to the sensor platform 110. Note that remote biometric authentication processor 150 may assign an expiration date/time for the symmetric key. When the symmetric key "expires," step 320 and/or step 330 are repeated to establish a new symmetric key for communication between remote biometric authentication processor 150 and sensor platform 110.

In an embodiment, in step 330, remote biometric authentication processor 150 generates a hash of the message (e.g., using HMAC, MAC, or CCMP) and signs the hash. The use of a digital signature provides a mechanism for the sensor platform 110 to verify that the message was received from a legitimate remote biometric authentication processor 150. In addition, remote biometric authentication processor 150 may sends its digital certificate to the sensor platform 110.

In step 340, sensor platform 110 decrypts the message to obtain the symmetric key using its private key. The symmetric key is then stored in sensor platform for use in encrypting communication between the sensor platform 110 and remote biometric authentication processor 150.

If the received message was signed by remote biometric authentication processor 150, sensor platform 110 verifies the signature in step 340. In an embodiment, the sensor platform 110 has a copy of the public key for remote biometric authentication processor 150 stored in memory. Alternatively, sensor platform 110 retrieves the public key from a remote database. The sensor platform 110 then uses that public key to verify the signature on the message. Alternatively, remote biometric authentication processor 150 may transmit a digital certificate to the sensor platform. In this embodiment, the sensor platform must retrieve the public key of the certificate authority which issued the remote biometric authentication processor's certificate. The sensor platform then validates the authenticity of the provided certificate using the public key of the certificate authority. The sensor platform can then use the public key provided in the certificate to verify the signature on the message.

In step 350, the sensor platform 110 engages in secure communications with remote biometric authentication processor 150. Two exemplary types of secure communications are biometric template enrollment communication and biometric template authentication communication. Biometric template enrollment is described in further detail in FIG. 4. Biometric authentication is described in further detail in FIG. 5.

Figure 4:
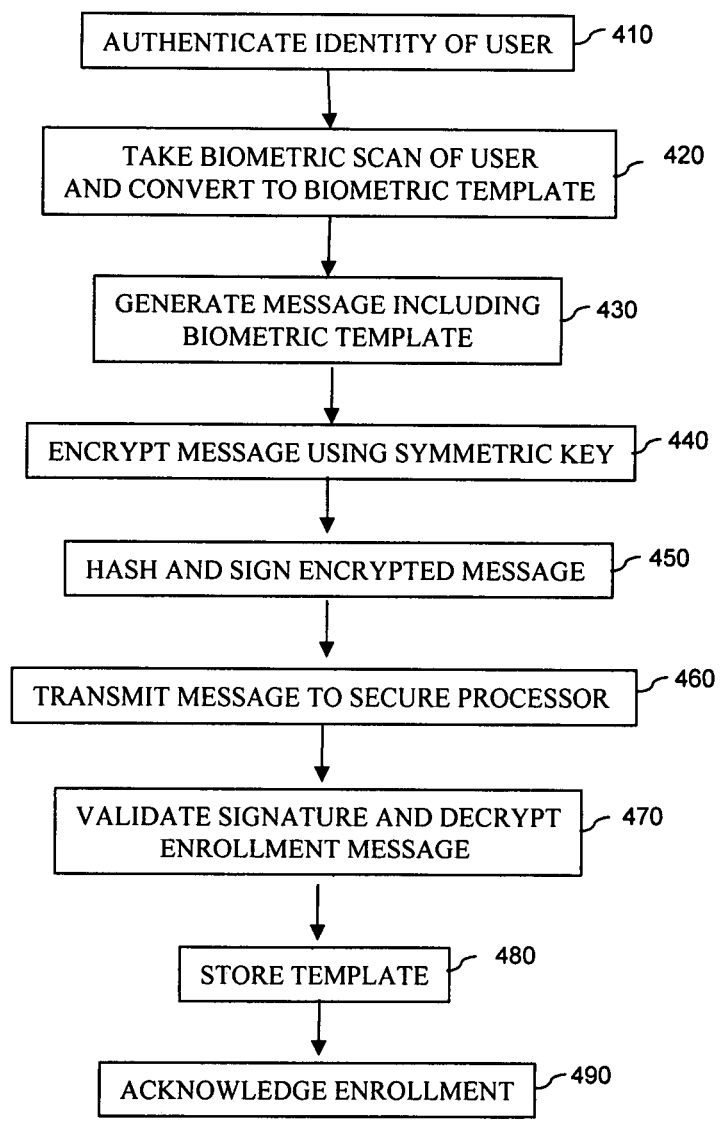
FIG. 4 depicts a flowchart of an illustrative method for secure enrollment of biometric templates in a remote database, according to embodiments of the present invention.

FIG. 4 depicts a flowchart 400 of an illustrative method for secure enrollment of biometric templates in a remote database, according to embodiments of the present invention. Flowchart 400 is described with continued reference to the illustrative system of FIG. 1. However, flowchart 400 is not limited to that embodiment. Note that some steps in flowchart 400 do not have to occur in the order shown.

In a system using biometric authentication, a valid user's biometric template must be enrolled in a database for use in future biometric authentication of the user. One or more sensor platforms 110 may include template enrollment logic. In addition or alternatively, one or more sensor platforms 110 may be coupled to a separate enrollment station 125.

In step 410, the identity of the user is validated. The validation of the user's identity is performed using a technique other than the biometric scan for which the user is being enrolled. During the enrollment process, the system must verify the identity of the user before storing his template in the database. Many techniques for validating the identity of a user can be used with the present invention. For example, a third party may physically inspect identification materials (e.g., driver's license, passport) before allowing the user to initiate enrollment. In addition, or alternatively, the enrollment station or enrollment logic may have the functionality to validate the identity of a user (e.g., requesting a password associated with the user).

In step 420, the enrollment station or enrollment logic takes a biometric scan of the user and converts the scan data to a biometric template. For example, if the sensor platform is a fingerprint scanner, the user places one finger, a group of fingers, a hand, etc. on a platen. The scanner then scans the finger or fingers and coverts the scan data to a fingerprint template for the user.

In step 430, the sensor platform 110 generates a message including the user's template. The message may optionally include identification of the user (e.g., user ID). However, because a template is unique, the system may only require the user's template for authentication.

In step 440, the sensor platform 110 encrypts all or a portion of the message using the stored symmetric key. As would be appreciated by a person of skill in the art, any suitable encryption algorithm such as DES, 3DES, or the Advanced Encryption Standard (AES) can be used with the present invention. As described above, encryption is performed by processor 112 of the sensor platform 110.

In step 450, the sensor platform 110 hashes and signs the encrypted message. Step 450 is optional. As would be appreciated by a person of skill in the art, any suitable hash/signature algorithm such as HMAC, MAC, SHA, or CCMP, can be used with the present invention. As described above, signature processing is performed by processor 112.

In step 460, the encrypted and signed message is transmitted to the remote biometric authentication processor 150.

In step 470, remote biometric authentication processor 150 validates the signature included in the message using the stored public key of the platform (provided in the digital certificate). In addition, in step 470, remote biometric authentication processor 150 decrypts the message using the symmetric key generated for communication with the sensor platform 110. If both the validation of the signature and the decryption are successful, remote biometric authentication processor 150 can assume that the message originated from the legitimate sensor platform 110.

If both the validation and decryption are successful, remote biometric authentication processor 150 stores the template in memory 156. In an embodiment, the template is associated with a user identifier (e.g., user ID). In addition or alternatively, a template is stored in memory 156 without being associated with user identification information. Templates are not tied to a specific sensor platform 110. After a template is enrolled in memory 156, a user can be authenticated on any sensor platform 110 supported by remote biometric authentication processor 150.

In step 490, remote biometric authentication processor 150 sends a message to sensor platform 110 acknowledging successful enrollment of the user template in memory 156. As described above, the message is encrypted using the symmetric key associated with the sensor platform 110 and optionally signed using the private key of remote biometric authentication processor 150.

Figure 5:
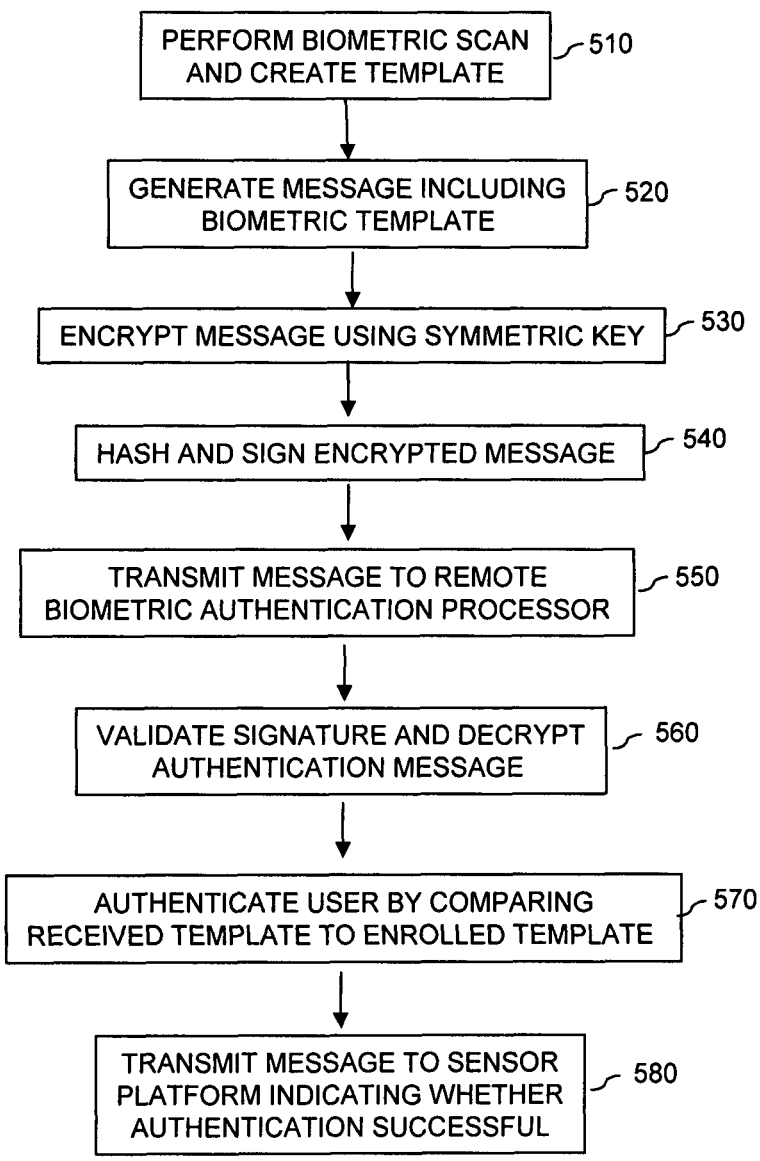
FIG. 5 depicts a flowchart of an illustrative method for secure biometric authentication of a user, according to embodiments of the present invention.

FIG. 5 depicts a flowchart 500 of an illustrative method for secure biometric authentication of a user, according to embodiments of the present invention. Flowchart 500 is described with continued reference to the illustrative system of FIG. 1. However, flowchart 500 is not limited to that embodiment. Note that some steps in flowchart 500 do not have to occur in the order shown.

In step 510, the biometric scan is performed and the scan data is converted into a template for authentication.

In step 520, the sensor platform 110 generates a message including the template for authentication. The message may optionally include identification of the user (e.g., user ID).

In step 530, the sensor platform 110 encrypts all or a portion of the message using the stored symmetric key. As would be appreciated by a person of skill in the art, any suitable encryption algorithm such as DES, 3DES, or the Advanced Encryption Standard (AES) can be used with the present invention. As described above, encryption is performed by processor 112 of the sensor platform 110.

In step 540, the sensor platform 110 hashes and signs the encrypted message. Step 540 is optional. As would be appreciated by a person of skill in the art, any suitable hash/signature algorithm such as HMAC, MAC, SHA, or CCMP, can be used with the present invention. As described above, signature processing is performed by processor 112.

In step 550, the encrypted and signed message is transmitted to remote biometric authentication processor 150.

In step 560, remote biometric authentication processor 150 validates the signature included in the message using the stored public key of the sensor platform (provided in the digital certificate). In addition, in step 560, remote biometric authentication processor 150 decrypts the message using the symmetric key generated for communication with sensor platform 110. If both the validation of the signature and the decryption are successful, remote biometric authentication processor 150 can assume that the message originated from the legitimate sensor platform 110.

If both the validation and decryption are successful, in step 570, remote biometric authentication processor 150 authenticates the user by comparing the received template with one or more stored templates. For example, the templates may be stored in database 150 with an associated user ID. In this example, remote biometric authentication processor 150 compares the received template to the template associated with the user ID in the message. In addition or alternatively, remote biometric authentication processor 150 may compare the received template to each template stored in database 150 until a match is found or all templates have been compared.

In step 580, remote biometric authentication processor 150 sends a message to sensor platform 110 indicating whether authentication was successful. The message is encrypted using the symmetric key associated with the sensor platform 110 and optionally signed using the private key of remote biometric authentication processor 150.

If the sensor platform 110 receives an indication that the user has been successfully authenticated, the sensor platform 110 allows the user to access additional applications, services, or computer resources. For example, the sensor platform 110 may allow the user to perform certain financial transactions.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for performing biometric authentication in a sensor platform using a remote biometric authentication platform storing a plurality of biometric templates, the method comprising:
   securely generating a public key and a private key within a physical security boundary of a secure processor of the sensor platform;
   communicating the public key to a warranty server over a first secure communications link;
   initiating a key enrollment process with a certification authority by communicating the public key to the certification authority over a second secure communications link;
   receiving a digital certificate for the sensor platform from the certification authority;
   communicating the digital certificate to the remote biometric authentication platform,
   establishing a third secure communications link with the remote biometric authentication platform by decrypting an encrypted symmetric key, generated by the remote biometric authentication platform, using the private key stored within the physical security boundary of the secure processor of the sensor platform;
   performing a biometric scan on an individual at the sensor platform;
   generating a biometric authentication template for the individual;
   communicating the generated biometric authentication template to the remote biometric authentication platform using the established third secure communications link to initiate biometric authentication at the remote biometric authentication platform; and
   receiving an indication of whether biometric authentication of the individual performed by the remote biometric authentication platform was successful.

2. The method of claim 1, wherein the private key of the sensor platform is injected into the secure processor.

3. The method of claim 1, further comprising:
   prior to establishing the third secure communications link, enrolling a biometric template of a second individual in the remote biometric authentication platform.

4. The method of claim 3, wherein the enrolling step further comprises:
   performing a biometric scan on the second individual at the sensor platform;
   generating an enrollment biometric template for the second individual;
   communicating the generated enrollment biometric template to the remote biometric authentication platform using the established third secure communications link; and
   receiving acknowledgement of the enrollment biometric template for the second individual in the remote biometric authentication platform.

5. The method of claim 4, wherein the remote biometric authentication processor compares the received generated enrollment biometric template to one or more enrollment biometric templates during authentication processing.

6. A method for performing network-based biometric authentication processing in a biometric authentication platform, the method comprising:
   authenticating a plurality of sensor platforms by validating a plurality of digital certificates sent by the sensor platforms and issued by a certification authority, wherein the certification authority authenticates identities of the sensor platforms using public keys securely sent to the certification authority by the sensor platforms, and wherein the public keys are securely generated within security boundaries of the sensor platforms;

if authentication is successful, establishing separate secure communications with the sensor platforms by generating a plurality of symmetric keys and sending the symmetric keys to respective sensor platforms in the plurality of sensor platforms, wherein the symmetric keys are encrypted with respective public keys associated with the sensor platforms, and wherein the symmetric keys are configured to be decrypted using respective private keys generated within physical security boundaries of respective secure processors of the sensor platforms;

storing a plurality of enrollment biometric templates in a memory, wherein the enrollment biometric templates are received from at least one of the plurality of sensor platforms;

receiving a request for authentication of an individual from one of the plurality of sensor platforms, wherein the request for authentication includes an authentication biometric template of the individual;

comparing the received authentication biometric template to at least one stored enrollment biometric template; and communicating a message including a result of the requested authentication to the requesting sensor platform.

7. The method of claim 6, wherein establishing the separate secure communications comprises:

transmitting a second message to a respective sensor platform in the plurality of sensor platforms including the encrypted symmetric key if the digital certificate of the sensor platform was successfully validated; and engaging in secure communications using the symmetric key to encrypt and decrypt communications between the respective sensor platform and remote biometric authentication platform.

8. The method of claim 6, wherein at least a portion of the request for authentication including the authentication biometric template of the individual is encrypted using the symmetric key assigned for secure communications with the requesting sensor platform.

9. The method of claim 8, wherein receiving the request for authentication of the individual comprises decrypting at least a portion of the request for authentication using the symmetric key assigned for secure communications with the requesting sensor platform.

10. The method of claim 7, wherein the request for authentication includes a digital signature generated using the private key of the requesting sensor platform.

11. The method of claim 10, wherein receiving the request for authentication of the individual comprises authenticating the received digital signature using the public key of the requesting sensor platform.

12. The method of claim 7, wherein communicating the message comprises:

encrypting at least a portion of the message including the result using the symmetric key of the requesting sensor platform.

13. The method of claim 6, wherein an enrollment biometric template is associated with an identifier of an individual associated with the enrollment biometric template.

14. The method of claim 13, wherein the request for authentication includes an identifier associated with the individual, and wherein comparing the received authentication biometric template to the at least one stored enrollment biometric template comprises comparing the received authentication biometric template to the enrollment biometric template stored for the received identifier.

15. A network-based biometric authentication platform comprising:

a device authentication processor configured to authenticate a plurality of sensor platforms to the biometric authentication platform by validating a plurality of digital certificates sent by the sensor platforms and issued by a certification authority, wherein the certification authority authenticates identities of the sensor platforms using public keys securely sent to the certification authority by the sensor platforms, and wherein the public keys and corresponding private keys are securely generated within physical security boundaries of respective secure processors of the sensor platforms;

a processor configured to establish separate secure communications with the sensor platforms by generating a plurality of symmetric keys and sending the symmetric keys to respective sensor platforms in the plurality of sensor platforms, wherein the symmetric keys are encrypted with respective public keys associated with the sensor platforms, and wherein the symmetric keys are configured to be decrypted using respective private keys generated within hardware security boundaries of respective secure processors of the sensor platforms;

an enrollment station configured to:
validate requests for enrollment of biometric templates from the authenticated sensor platforms, and
store enrollment biometric templates from valid sensor platforms, wherein the biometric templates are associated with an individual;

a user authentication processor configured to:
process requests for authentication of individuals from the authenticated sensor platforms, and
compare received biometric templates with enrolled biometric templates; and a memory including a plurality of enrollment biometric templates.

16. The method of claim 1, further comprising:
authenticating the sensor platform to the remote biometric authentication platform.

17. The method of claim 1, wherein the symmetric key is assigned an expiration time by the remote biometric authentication platform, and wherein the method further comprises establishing a new secure communications link with the remote biometric authentication platform upon expiration of the symmetric key.

18. The method of claim 1, further comprising:
prior to establishing the third secure communications link, authenticating the remote biometric authentication platform.

19. The method of claim 18, further comprising:
receiving, from the remote biometric authentication platform, a message having a digital signature;
receiving, from the remote biometric authentication platform, a platform public key corresponding to the remote biometric authentication platform; and
authenticating the remote biometric authentication platform by decrypting the digital signature with the platform public key and comparing the decrypted digital signature with information in the message.

20. The method of claim 6, further comprising:
generating a hash of the message; and
attaching the hash to the message prior to communicating the message to the requesting sensor platform.

* * * * *